(12) United States Patent
Hayashi et al.

(10) Patent No.: US 8,470,912 B2
(45) Date of Patent: Jun. 25, 2013

(54) GRANULATED COLORANT AND RELATED ART

(75) Inventors: Akihiko Hayashi, Neyagawa (JP); Satonari Morikawa, Neyagawa (JP)

(73) Assignee: Orient Chemical Industries, Ltd., Osaka (JP)

( * ) Notice: Subject to any disclaimer, the term of this patent is extended or adjusted under 35 U.S.C. 154(b) by 178 days.

(21) Appl. No.: 12/950,078

(22) Filed: Nov. 19, 2010

(65) Prior Publication Data

US 2011/0065844 A1    Mar. 17, 2011

Related U.S. Application Data

(63) Continuation of application No. 11/566,373, filed on Dec. 4, 2006, now abandoned.

(30) Foreign Application Priority Data

Dec. 27, 2005 (JP) ................................. 2005-375545

(51) Int. Cl.
*C08J 3/20* (2006.01)
*C04B 14/00* (2006.01)
*D06P 1/00* (2006.01)

(52) U.S. Cl.
USPC .................. 523/351; 8/526; 8/636; 106/401; 106/493

(58) Field of Classification Search
USPC ... 524/89, 90; 106/493, 401; 523/351; 8/524, 8/636, 526; 264/140, 143
See application file for complete search history.

(56) References Cited

U.S. PATENT DOCUMENTS

| | | | | | |
|---|---|---|---|---|---|
| 4,239,543 | A | * | 12/1980 | Beasley | 106/31.43 |
| 5,507,991 | A | * | 4/1996 | Mudd | 264/143 |
| 5,827,911 | A | * | 10/1998 | Hayashi et al. | 524/89 |
| 6,712,862 | B1 | * | 3/2004 | Grimm et al. | 8/524 |
| 2003/0064311 | A1 | * | 4/2003 | Yamazaki et al. | 430/108.1 |
| 2004/0126692 | A1 | * | 7/2004 | Yamanouchi et al. | 430/110.3 |
| 2005/0106118 | A1 | * | 5/2005 | Sakuma et al. | 424/70.24 |

* cited by examiner

*Primary Examiner* — Hannah Pak
(74) *Attorney, Agent, or Firm* — McGlew and Tuttle, P.C.

(57) ABSTRACT

A granulated colorant as a granulation product of a powdery nigrosine dye, that has a bulk density of 0.4 to 0.7 g/ml and a hardness of 1 to 20 N. A high-concentration master batch obtained by blending a granulated colorant and a thermoplastic resin, which comprises 25 to 100 parts by weight of a nigrosine dye in the granulated colorant per 100 parts by weight of the thermoplastic resin. A colored composition comprising a granulated colorant or high-concentration master batch and a thermoplastic resin or thermoplastic elastomer.

19 Claims, 1 Drawing Sheet

GRANULATED COLORANT AND RELATED ART

CROSS REFERENCE TO RELATED APPLICATIONS

This application is a Continuation of, and claims the benefit of priority under 35 U.S.C. §120 of, U.S. patent application Ser. No. 11/566,373 filed Dec. 4, 2006, which claims the benefit of priority under 35 U.S.C. §119 of Japanese Patent Application 2005-375545 filed Dec. 27, 2005, the entire contents of all priority applications are incorporated herein by reference.

BACKGROUND OF THE INVENTION

1. Field of the Invention

The present invention relates to a nigrosine granulated colorant that is used to impart a color to thermoplastic resin and for other purposes and has good handlability and good dispersibility in resin, a method of producing the same, a high-concentration master batch using the granulated colorant, a method of producing the same, and a colored composition using the granulated colorant or high-concentration master batch.

2. Description of the Prior Art

Because thermoplastic resins have excellent mechanical and chemical properties, they are widely used in plastic molding products in the field of components for automobiles, electric/electronic products and the like, and the demands are increasing in the field of engineering plastics. Additionally, thermoplastic resins are fitted to a broad range of industrial applications by formulating fibrous reinforcing material in thermoplastic resins to improve the heat resistance and chemical resistance, and to confer mechanical properties matching with various applications. In particular, in the field of automobiles, bicycles and the like, there has been a remarkable trend toward replacement of conventional metal parts with fiber-reinforced thermoplastic resin parts, for the purpose of weight reduction, manufacturing process rationalization and corrosion prevention.

Thermoplastic resins are colored for decoration, color identification, improvement of light fastness of molded products, content protection and shading and for other purposes, with black coloring being the most important in the industry. Traditionally, various inorganic pigments and organic dyes/pigments, such as carbon black, black metal complex dyes, nigrosine dyes and perinone black, have been used to impart a black color to thermoplastic resins. Of these, nigrosine dyes enable imparting vividly black colors with excellent appearance and surface gloss, and hence have been widely used to impart a color to thermoplastic resins with various attempts.

Specifically, such attempts include a molded blend wherein a polyamide resin is colored with carbon black and nigrosine (Japanese Patent Examined Publication No. SHO-60-43379), a glass fiber-reinforced black polyamide resin composition comprising a polyamide resin, a surface-treated glass fiber and an azine dye (Japanese Patent Laid-Open No. HEI-6-128479), a black polyamide resin composition wherein a polyamide resin is colored with a nigrosine dye, aniline black and carbon black (Japanese Patent Laid-Open No. HEI-9-255869), a polyester resin composition wherein a polyester resin is colored with a dye having a phenazine ring (nigrosine dye) (Japanese Patent Laid-Open No. HEI-10-292098), a colored thermoplastic resin composition wherein a crystalline resin (e.g., polyamide resin, polybutylene terephthalate resin, etc.) is colored with a modified nigrosine dye and related art (Domestic Re-publication of PCT International Publication No. WO00/26302).

Generally, in coloring a fiber-reinforced thermoplastic resin, a problem arises that the colorant (particularly black pigment) is difficult to sufficiently uniformly disperse in the resin even with a long time of kneading, because a fibrous reinforcing material is present in the resin. In particular, the spoilage of the gloss, appearance and the like of the colored molded product by the fibrous reinforcing material floating on the surface of the molded product during molding has been problematic. In this regard, there is room for improving colored resin compositions comprising a nigrosine dye.

Additionally, because nigrosine dyes are powders having small values of bulk density and average particle diameter, nigrosine dye dusting can occur during dye charge, blending with the resin, and the like, posing the problem with work environment deterioration, so that special measures have been required to prevent the dusting.

Furthermore, a master batch of nigrosine dye is produced by, for example, blending a resin and a dye in a mechanical mixer such as a Henschel mixer or blender, and extrusion-molding the blend using a single-screw extruder or twin-screw extruder into a resin pellet. In this manufacturing process, however, drawbacks, including phenomena such as bridging in the hopper and unsmooth feed of raw materials (resin, nigrosine dye, etc.) into the screw during extrusion kneading due to fluidity differences between nigrosine dye and resin, and a lack of fluidity due to dye wetting and adhesion as a result of dye exposure to the gas from the resin, additives and the like in the extrusion process, have been likely. As such, nigrosine dyes are extremely poorly handlable; it has been difficult to fill a nigrosine dye in a master batch at high concentrations.

The present invention has been developed in view of the aforementioned problems in the prior art, and is intended to provide a colorant that modifies the dusting of nigrosine dye, ensures good handlability in transportation, packaging, charge and the like, is unlikely to lose shape during the handling, and enables good and uniform dispersion of a nigrosine dye in a resin by blending or kneading with the resin in various forms of color imparting, including coloring a resin containing a fibrous reinforcing material and high-concentration resin coloring, a method of producing the same, a master batch that does not exhibit bridging or separation of a colorant from resin during blending or kneading said colorant with the resin during production and uniformly contains a high concentration of nigrosine dye, a method of producing the same, and a colored composition that uniformly contains a nigrosine dye, has a well controlled crystallization temperature with nigrosine dye, enables easier commercialization of products that must meet the rigorous demands for precision molding and dimensional accuracy, confers good appearance and surface gloss to molded products, has excellent light fastness, undergoes little color changes over time, and has good mechanical properties.

SUMMARY OF THE INVENTION

Accomplishing the above-described object, the granulated colorant of the present invention is a granulated colorant that is a granulation product of a powdery nigrosine dye, wherein the granulation product has a bulk density of 0.4 to 0.7 g/ml and a hardness of 1 to 20 N.

The aforementioned hardness (hardness determined using a KIYA type hardness meter) is preferably 2 to 15 N, more preferably 3 to 12 N. By rendering the granulated colorant to have such a hardness, both good handlability during transportation and the like and good dispersibility of nigrosine dye in resin can be achieved at the same time.

The above-described powdery nigrosine dye in the granulated colorant of the present invention preferably has an average particle diameter of 5 to 20 μm. The specific surface area of the powdery nigrosine dye is preferably 1.5 to 5.5 $m^2/g$. The Fe content of the above-described nigrosine dye in the granulated colorant of the present invention is preferably not more than 1% by weight.

The above-described granulation product of the present invention can be cylindrical. Preferably, the above-described granulation product of the present invention is a cylindrical pellet having a diameter of 2 to 4 mm. More preferably, the diameter is 2.5 to 3.5 mm. The length of the cylindrical pellet is preferably 7 to 12 mm. More preferably, the length is 8 to 10 mm.

The problems of the present invention are well solved by a granulated colorant in the form of such pellets wherein the granulation product has a bulk density of 0.4 to 0.7 g/ml and a hardness of 1 to 20 N.

The above-described granulated colorant is preferably a dried product of a granulated blend of 100 parts by weight of a nigrosine dye and 20 to 55 parts by weight of water.

The method of producing a granulated colorant of the present invention comprises a blending step for blending a powdery nigrosine dye and water, a granulation step for obtaining a cylindrical granulation product from the blend obtained in said blending step using an extrusion granulating machine, and a drying step for drying the granulation product obtained in said granulation step, wherein the granulation product after drying by said drying step has a bulk density of 0.4 to 0.7 g/ml and a hardness of 1 to 20 N. The aforementioned hardness is preferably 2 to 15 N, more preferably 3 to 12 N.

The blending step in the above-described method of producing a granulated colorant is preferably a step for blending 100 parts by weight of a nigrosine dye and 20 to 55 parts by weight of water using a rotary mechanical mixer. The granulation step in the above-described method of producing a granulated colorant is preferably a step for obtaining a cylindrical granulation product having a hardness after drying of 1.0 to 20 N, preferably 2 to 15 N, more preferably 3 to 12 N by granulating the blend obtained in said blending step, while adjusting the pressure and/or revolution speed of the extrusion granulating machine.

The high-concentration master batch of the present invention is a master batch obtained by blending at least the above-described granulated colorant and a thermoplastic resin, wherein 25 to 100 parts by weight of a nigrosine dye in the aforementioned granulated colorant is contained per 100 parts by weight of the aforementioned thermoplastic resin.

The method of producing a high-concentration master batch of the present invention comprises a blending step for blending a powdery nigrosine dye and water, a granulation step for obtaining a cylindrical granulation product from the blend obtained in said blending step using an extrusion granulating machine, a drying step for drying the granulation product obtained in said granulation step, and a blend-molding step for blending at least the granulated colorant obtained via said drying step and a thermoplastic resin, and molding the blend into a master batch comprising 25 to 100 parts by weight of the nigrosine dye in said granulated colorant per 100 parts by weight of said thermoplastic resin using an extruding machine, wherein the granulation product after drying by said drying step has a bulk density of 0.4 to 0.7 g/ml and a hardness of 1 to 20 N. The aforementioned hardness is preferably 2 to 15 N, more preferably 3 to 12 N.

The colored composition of the present invention is a colored composition obtained by blending at least the granulated colorant of the present invention or the high-concentration master batch of the present invention 1, and a thermoplastic resin or thermoplastic elastomer, wherein 0.01 to 10 parts by weight of the nigrosine dye in said granulated colorant or high-concentration master batch is contained per 100 parts by weight of said thermoplastic resin or thermoplastic elastomer.

The present inventors found that it is possible to prevent nigrosine dye dusting, to ensure shape stability for the granulation product during handling in transportation, packaging, charge and the like, and to prevent drawbacks, including phenomena such as bridging in the hopper and unsmooth feed of raw materials (resin, nigrosine dye, etc.) into the screw, due to fluidity differences of a colorant from the resin, and a lack of fluidity due to dye wetting by the gas from the extruding machine, during blending or kneading with the resin during production of a master batch or colored composition, by granulating a powdery nigrosine dye into a granulation product (preferably into a cylindrical form) while adjusting the hardness and bulk density, and developed the present invention.

The granulated colorant of the present invention modifies nigrosine dye dusting, ensures good handlability in transportation, packaging, charge and the like, is unlikely to lose shape during the handling, and prevents bridging and separation from the resin in the screw feeder and the like or ununiform dispersion in the resin to ensure good fluidity and stable dispersibility and enable good dispersion of the nigrosine dye in the resin during blending or kneading with the resin in various forms of color imparting to a resin, including coloring a resin containing a fibrous reinforcing material and high-concentration resin coloring.

The high-concentration master batch of the present invention, which uniformly comprises at a high concentration a nigrosine dye, can be produced without bridging or separation of colorant from the resin during blending or kneading the granulated colorant of the present invention with the resin in the production.

The colored composition of the present invention uniformly comprises a nigrosine dye, has a well controlled crystallization temperature with nigrosine dye, enables easier commercialization of products that must meet the rigorous demands for precision molding and dimensional accuracy, confers good appearance and surface gloss to molded products, has excellent light fastness, undergoes little color changes over time, has good mechanical properties, and is best suited as a material for sophisticated molding products.

The granulated colorant of the present invention modifies nigrosine dye dusting, ensures increased safety for the work environment, and permits easier transportation, packaging and charge, thus ensuring much better handlability compared with powdery nigrosine. The granulated colorant of the present invention also exhibits good fluidity and stable dispersibility in resin, and is suitably used to produce a high-concentration master batch and an ordinary-concentration resin composition.

Also, because the nigrosine dye in the granulated colorant of the present invention functions as a positively charged charge control agent, it enables suitable use of the granulated colorant of the present invention in manufacturing a toner for developing electrostatic images utilizing the good dispersibility thereof in resin.

Furthermore, because the granulated colorant of the present invention functions as a black oil-soluble nigrosine dye, it can be suitably used in solution in a solvent and the like in recording liquids, writing instrument ink and the like, and can also be used as a colorant for leather and the like.

Because the colored composition of the present invention has low anisotropy and is excellent in heat resistance, sliding quality and dimensional accuracy, is excellent in mechanical properties, particularly in impact strength, and confers excellent surface appearance to molded products, it is useful as an engineering plastic in, for example, electric/electronic components such as connectors, sockets, relay case switches, variable condenser cases, optical pickups, plugs, printed substrates, tuners, speakers, microphones, headphones, FDD chassis, motor brush holders, parabola antennas, computer-related components, VTR components, television components, irons, hair dryers, electric rice cooker components, microwave oven components, acoustic components, audio/laser discs, compact discs, lighting components, refrigerator components, air conditioner components, and word processor components; office machine components such as typewriter parts; telephone-related components, facsimile-related components, copying machine-related components, to washing devices, motor components, lighters, machine-related components; optical equipment/precision equipment-related components such as microscopes, binoculars, cameras, and watches and clocks; automobile/vehicle-related components such as alternator connectors, IC regulators, various valves such as exhaust gas valves, various fuel supply/exhaust/air intake system pipes, air intake nozzles, intake manifolds, fuel pumps, engine coolant joints, carburetor main bodies, carburetor spencers, air flowmeters, starter switches, transmission wire harnesses, window washer nozzles, air conditioner panel switch substrates, fuse connectors, horn terminals, electric appliances insulation panels, and igniter cases; and various other applications.

DETAILED DESCRIPTION OF THE INVENTION

Nigrosine Dyes Used in the Present Invention

As the nigrosine dye which is a raw material for the granulated colorant (granulation product of powdery nigrosine dye) of the present invention, the black azine-series condensed mixture described as C.I. SOLVENT BLACK 5, C.I. SOLVENT BLACK 5:1, C.I. SOLVENT BLACK 5:2 and C.I. SOLVENT BLACK 7 in the COLOR INDEX can be suitably used (in this specification, C.I. Generic Names are described according to the third edition of the COLOUR INDEX). Synthesis of the nigrosine dye can be achieved by, for example, oxidizing and dehydrate-condensing aniline, aniline hydrochloride and nitrobenzene in the presence of iron chloride at a reaction temperature of 160 to 180° C. Nigrosine is produced as a mixture of various different compounds depending on reaction conditions, raw materials charged, charge ratio and the like; for example, it is postulated that nigrosine may be a mixture of various triphenazineoxazines represented by the following Formula (I) or (II) and phenazineazine compounds represented by Formulas (III) to (VI).

[I]

[II]

[III]

[IV]

[V]

-continued

[In Formulas (I) to (VI), X⁻ represents an anion, for example, Cl⁻ or OH⁻.]

Examples of commercially available nigrosine dyes include Spirit Black SB, Spirit Black SSBB, Spirit Black AB (all are categorized under C.I. SOLVENT BLACK 5); Nigrosine Base SA, Nigrosine Base SAP, Nigrosine Base SAP-L, Nigrosine Base EE, Nigrosine Base EE-L, Nigrosine Base EX, Nigrosine Base EX-BP (all are categorized under C.I. SOLVENT BLACK 7) and the like [all are product names of nigrosines manufactured by Orient Chemical Industries, Ltd.]. From among these nigrosine dyes, desired one meeting the requirements can be selected.

The aforementioned nigrosine dye can, for example, be one having an average particle diameter of 5 to 30 μm. Preferably, the average particle diameter is 5 to 20 μm, more preferably 5 to 15 μm. By using such a nigrosine dye, it is possible to obtain a granulation product having a hardness that meets the requirement of the present invention at high yield.

As an example of the method of determining the average particle diameter in this case, a method can be mentioned that comprises adding water to the dye, previously mixed with an activator, and performing a determination under particular conditions. Examples of useful analyzers include a precision distribution analyzer [Multilyzer III (product name): manufactured by Beckman Coulter, K.K.], a laser diffraction/scattering particle size distribution tester [product number: LA-910, manufactured by Horiba Ltd.] and the like.

To obtain a granulated colorant of good quality, it is preferable that the aforementioned nigrosine dye have a specific surface area of 1.5 to 5.5 $m^2/g$, as determined by the BET method. More preferably, the specific surface area is 2.5 to 4.0 $m^2/g$. When a nigrosine dye is blended with a binder and granulated by compression extrusion and the like using a granulating machine, it is possible to obtain a granulation product at good yield by appropriately blending a nigrosine dye having a specific surface area of 1.5 to 5.5 $m^2/g$, as determined by the BET method, with a binder (e.g., water); the granulation product obtained is capable of well exhibiting the effect of the present invention.

Furthermore, it is important that the nigrosine dye in the granulated colorant of the present invention should be a nigrosine dye having an Fe content of not more than 1.0% by weight. More preferably, the Fe content is not more than 8000 ppm. The dispersibility and compatibility of the nigrosine dye for the resin are thereby improved, so that a particularly good high-concentration master batch is obtained. The Fe content in such a nigrosine can be determined by atomic absorptiometry.

A treatment to reduce the Fe content of such a nigrosine can, for example, be performed as described below. Specifically, the Fe content in the nigrosine dye after drying can be reduced or adjusted by removing the iron hydroxide separating during the base treatment of nigrosine with the addition of sodium hydroxide to the nigrosine condensation product obtained by condensing aniline and aniline hydrochloride with nitrobenzene in the presence of ferric chloride, using a centrifuge such as a screw decanter or a Sharpless centrifuge.

A particularly preferable nigrosine dye is a nigrosine dye having low contents of the reaction starting material aniline and the reaction solvent nitrobenzene. Specifically, a nigrosine dye having an aniline content of not more than 2000 ppm, preferably not more than 1000 ppm (more preferably not more than 700 ppm), and a nitrobenzene content of not more than 500 ppm (more preferably not more than 300 ppm) can be mentioned. As examples of the method of purifying such a nigrosine dye, the following methods (1) to (6) can be mentioned.

(1) A method of adding a solvent having a boiling point of 100 to 230° C., and removing the aniline and/or nitrobenzene along with the solvent under heating and reduced pressure. Examples of such solvents include xylene, toluene, ethylbenzene, mesitylene, decahydronaphthalene, dibutyl ether, ethylene glycol and the like.
(2) A method of washing the nigrosine dye with a solution in which aniline and/or nitrobenzene is soluble, and removing the solvent. As examples of such a solution, organic solvents (e.g., alcohols, glycols), aqueous solutions, mixed solutions of organic solvents and water, or acidic solutions of these solvents or solutions can be mentioned.
(3) A method of removing the aniline and/or nitrobenzene simply by heating at reduced pressure.
(4) A method of thermal distillation.
(5) A method of distillation such as steam distillation.
(6) A method of oxidation using oxygen, ozone, bleaching powder or another oxidant.

Nigrosine Dye Granulation Process for Obtaining a Granulated Colorant

The granulated colorant of the present invention is a granulation product of a powdery nigrosine dye, which granulation product has a bulk density of 0.4 to 0.7 g/ml and a hardness of 1 to 20 N, preferably 2 to 15 N, and more preferably 3 to 12 N.

When using the granulated colorant of the present invention, it can be effective even if a mixture of the granulated colorant of the present invention and an ungranulated nigrosine dye (e.g., powdery nigrosine dye) is used as the colorant. For example, when the granulated colorant of the present invention accounts for at least 70% by weight (preferably not less than 75% by weight, more preferably not less than 80% by weight) of the nigrosine dye used as the colorant, it can be fully effective.

As a suitable shape of the granulation product, a cylindrical pellet having a diameter (ø) of 2 to 4 mm can be mentioned. A preferable length thereof is 7 to 12 mm.

In the present invention, a granulation product having a cross-section not completely circular but with an irregularity of not more than 20% of the diameter, a granulation product having a nearly circular cross-section, such as an ellipsoidal or deformed circle, and/or a granulation product having a cross-section the shape and dimensions of which are not constant in the axial direction, can also be deemed a cylindrical granulation product.

Regarding the shape of the granulation product, a non-cylindrical column is acceptable. For example, the granulation product may be a non-cylindrical columnar pellet of 2 to 4 mm (more preferably 2.5 to 3.5 mm) in height and width and 3 to 10 mm (more preferably 8 to 10 mm) in length.

Although the method of granulation to obtain the granulated colorant of the present invention is not subject to limitation, extrusion granulation can be mentioned as a suitably used method. As the extrusion granulating machine for performing extrusion granulation, the forward pressing screw type, lateral pressing screw type, forward pressing ram type, lateral pressing roll type, downward pressing roll type, lateral pressing basket type, and downward pressing screen type and the like can be mentioned, with preference given to, for example, a downward pressing roll type extrusion granulating machine.

The method of producing the granulated colorant of the present invention comprises a blending step for blending a powdery nigrosine dye and water, a granulation step for obtaining a cylindrical granulation product from the blend obtained in the aforementioned blending step using an extrusion granulating machine, and a drying step for drying the granulation product obtained in the aforementioned granulation step, wherein the granulation product after drying by the aforementioned drying step has a bulk density of 0.4 to 0.7 g/ml, and a hardness of 1 to 20 N, preferably 2 to 15 N, and more preferably 3 to 12 N. The blending step is preferably a step for blending 100 parts by weight of a nigrosine dye and 20 to 55 parts by weight of water (preferably 30 to 45 parts by weight of water) using a rotary mechanical mixer. The granulation step is preferably operated using a granulating machine such as an extrusion granulating machine.

Hardness is important to the granulated colorant of the present invention. By appropriately adjusting the hardness thereof, the granulated colorant of the present invention is obtained with two characteristics: a loss of shape is unlikely and stability and ease of handling are maintained during transportation, charge and the like, and the nigrosine is well dispersible in the resin during blending or kneading with the resin in coloring the resin at the time of resin molding and the like. The hardness of the granulated colorant (i.e., the granulation product after the granulation drying step) is 1 to 20 N. Preferably, the hardness is 2 to 15 N, more preferably 3 to 12 N.

Adjustment of the hardness of the granulated colorant of the present invention can be achieved by, for example, adjusting the granulation pressure and/or revolution speed of the extrusion granulating machine in the granulation step for granulating the blend obtained in the blending step using the extrusion granulating machine. In addition to this adjustment of the hardness in the granulation step, a granulation product with an appropriately adjusted hardness can be obtained efficiently by adjusting the hardness of the blend after the blending step for blending a nigrosine dye and a binder preferably to 1 to 20 N, more preferably to 2 to 15 N.

In addition to water, non-water binders can be used as the binder for obtaining the granulated colorant of the present invention. Examples of the binder other than water alone include a surfactant, wax, metal soap, polyethylene glycol, or a mixture of any of these and water.

Examples of the aforementioned surfactant include a non-ionic surfactant, anionic surfactant, and cationic surfactant can be used.

Examples of the aforementioned non-ionic surfactant include polyoxyalkylene alkyl ether, polyoxyalkylene lauryl ether, polyoxyethylene oleyl ether, polyoxyethylene alkylphenyl ether, polyoxyethylene glycol fatty acid ester, alkylalkanolamide, polyoxyethylene polyoxypropylene glycol and the like.

Examples of the aforementioned anionic surfactant include a benzenesulfonic acid optionally having 0 to 2 alkyl groups or hydroxyl groups or a salt thereof, an alkyldiphenyl ether sulfonic acid or a salt thereof, α-olefinsulfonic acid or a salt thereof, polystyrenesulfonic acid or a salt thereof, an alkyl sulfuric acid ester or a salt thereof, a polyoxyethylene alkyl ether sulfuric acid ester or a salt thereof, a polyoxyethylene alkylphenyl ether sulfuric acid ester or a salt thereof, an alkyl ether phosphoric acid ester salt, an alkylphosphoric acid ester and the like.

Examples of the aforementioned cationic surfactant include lauryl trimethyl ammonium chloride, didecyl dimethyl ammonium chloride and the like.

Examples of the aforementioned wax include what are generally known as polyethylene wax, polypropylene wax, synthetic wax, paraffin wax, micro wax, montan wax, ester wax, ceresin wax, and chloride wax. Preferably, the aforementioned wax is a polyethylene wax having a molecular weight of 500 to 10000.

Examples of the aforementioned metal soap include salts of stearic acid, palmitic acid, lauric acid, octylic acid, ricinoleic acid, oleic acid, naphthenic acid and the like with metals such as magnesium, zinc, calcium, aluminum, potassium, barium, lithium, cadmium, strontium, and tin.

In addition to a nigrosine dye, the granulated colorant, high-concentration master batch or colored composition in the present invention may comprise a known dye or pigment within the bounds of the purpose of the present invention. Black dyes/pigments include carbon black and aniline black. Auxiliary colorants and the like for color adjustment include various organic dyes/pigments such as of the azo series, azo series metal complex, azomethine series, anthraquinone series, quinacridone series, dioxazine series, diketopyrrolopyrrole series, anthrapyridone series, isoindolinone series, indanethrone series, perinone series, perylene series, indigo series, thioindigo series, quinophthalone series, quinoline series, and triphenylmethane series.

In addition to the above-described ingredients, the granulated colorant may be supplemented as appropriate with commonly used heat stabilizers, antioxidants, ultraviolet absorbents, fillers and the like High-Concentration Master Batch Production Process Using the Granulated Colorant The high-concentration master batch of the present invention is a master to batch obtained by blending at least the above-described granulated colorant of the present invention and a thermoplastic resin, which comprises 25 to 100 parts by weight (more preferably 60 to 100 parts by weight) of a nigrosine dye in the granulated colorant per 100 parts by weight of the thermoplastic resin. The high-concentration master batch of the present invention can also be obtained using a mixture of the granulated colorant of the present invention and an ungranulated nigrosine dye (e.g., powdery nigrosine dye) as the colorant. For example, when the granulated colorant of the present invention accounts for at least 70% by weight (preferably not less than 75% by weight, more preferably not less than 80% by weight) of the nigrosine dye used as the colorant, the high-concentration master batch of the present invention uniformly comprising a nigrosine dye at a high concentration can be obtained.

The effect of the high-concentration master batch of the present invention is remarkable particularly when the nigrosine dye concentration is high. Hence, the high-concentration master batch of the present invention permits easy and sure obtainment of a master batch uniformly comprising a nigrosine dye at a high concentration (e.g., not less than 40% by weight). In the case of a conventional master batch wherein a powdery nigrosine dye is dry-blended, the nigrosine dye concentration is about 20 to 40% by weight, the upper limit being about 40% by weight. However, a high-concentration master batch using the granulated colorant of the present invention can be made to have a nigrosine dye concentration of 40 to 50% by weight or more, and prevents bridging and the like by the nigrosine dye in the hopper in the master batch production step.

The high-concentration master batch of the present invention is obtained by a production method comprising a blending step for blending a powdery nigrosine dye and water, a granulation step for obtaining a cylindrical granulation product from the blend obtained in the aforementioned blending step using an extrusion granulating machine, a drying step for drying the granulation product obtained in the aforementioned granulation step (wherein the granulation product after drying by the drying step has a bulk density of 0.4 to 0.7 g/ml and a hardness of 1 to 20 N, preferably 2 to 15 N, more preferably 3 to 12 N), and a blend-molding step for blending at least the granulated colorant obtained via the aforementioned drying step and a thermoplastic resin, and molding the blend into a master batch comprising 25 to 100 parts by weight of a nigrosine dye in the aforementioned granulated colorant per 100 parts by weight of the aforementioned thermoplastic resin using an extruding machine (e.g., master batch in the form of resin pellet).

Specifically, a master batch in the form of pellet can be obtained by, for example, blending the granulated colorant of the present invention and a resin, and if necessary other materials, as uniformly as possible, by an optionally chosen method of blending, homogenizing this blend by kneading in a molten state using a heated extruding machine, then extruding it into wire shape and cutting the wire to a desired length.

As the aforementioned thermoplastic resin, polyamide (nylon) resin, polyethylene resin, polypropylene resin, polyethylene terephthalate resin, polybutylene terephthalate resin, polyphenylene sulfide resin, polycarbonate resin, polysulfone resin and polyether ether ketone resin and the like can be mentioned. The high-concentration master batch of the present invention can also be formulated with various additives (e.g., auxiliary colorant, wax etc.) as necessary.

Colored Composition Using the Granulated Colorant or Master Batch

The colored composition of the present invention is a colored composition obtained by blending at least the granulated colorant of the present invention or the high-concentration master batch of the present invention and a thermoplastic resin or thermoplastic elastomer, wherein 0.01 to 10 parts by weight (preferably 0.01 to 5 parts by weight) of a nigrosine dye in the aforementioned granulated colorant or high-concentration master batch is contained per 100 parts by weight of the aforementioned thermoplastic resin or thermoplastic elastomer. An ungranulated nigrosine dye (e.g., powdery nigrosine dye) can be used as a colorant along with a granulated colorant, as described above.

Examples of the thermoplastic resin in the colored composition of the present invention include polyamide (nylon) resin, polyethylene resin, polypropylene resin, polyethylene terephthalate resin, polybutylene terephthalate resin, polyphenylene sulfide resin, polycarbonate resin, polysulfone resin, polyether ether ketone resin and the like. These thermoplastic resins can be used alone or in combination of two or more kinds. A copolymer or mixture based mainly on these polymers; or a polymer alloy comprising these thermoplastic resins at not less than 10% by weight, and the like can also be used.

A preferable thermoplastic resin is 1 or 2 or more synthetic resins selected from the group consisting of polyamide resin, polyethylene terephthalate resin, polybutylene terephthalate resin, and polyphenylene sulfide resin.

Examples of the thermoplastic elastomer in the colored composition of the present invention include thermoplastic elastomers such as polystyrene-series thermoplastic elastomers, polyolefin-series thermoplastic elastomers, polyurethane-series thermoplastic elastomers, and polyester-series thermoplastic elastomers.

The colored composition of the present invention produces molded products having excellent impact resistance and appearance, and is highly practical. The colored composition of the present invention has an at least 10% better elongation characteristic compared with the same composition, but not containing a colorant.

The colored composition of the present invention can contain a reinforcing material and a filling material, as long as the object of the present invention is not interfered with. Examples of these reinforcing materials and filling materials include fibrous, powdery, granular or tabular inorganic fillers such as glass fiber, carbon fiber, aromatic polyamide fiber, gypsum fiber, brass fiber, stainless steel fiber, steel fiber, ceramic fiber, boron whisker fiber, graphite, mica, talc, silica, calcium carbonate, glass beads, glass flakes, glass microbaloons, clay, wallastenite, titanium oxide, and molybdenum disulfide. These reinforcing materials and filling materials may be those treated with a coupling agent such as of the silane-series or titanate-series, and other surface treatment agents.

In the case of glass fiber, for example, the content thereof is preferably 5 to 120 parts by weight per 100 parts by weight of thermoplastic resin. If the glass fiber content is less than 5 parts by weight, a satisfactory reinforcing effect is difficult to achieve with the glass fiber; if the glass fiber content exceeds 120 parts by weight, the moldability tends to decrease. Preferably, the glass fiber content is 10 to 60 parts by weight, particularly preferably 20 to 50 parts by weight, per 100 parts by weight of thermoplastic resin.

Furthermore, the colored composition of the present invention can be formulated with various additives as required. Examples of such additives include auxiliary colorants, dispersing agents, stabilizers, plasticizers, modifiers, ultraviolet absorbents or light stabilizers, antioxidants, antibacterial/antifungal agents, antistatic agents, flame retardants, and elastomers for improved impact resistance.

Examples of modifiers include silicon compounds such as amino-modified silicone oil and alkyl-modified silicone oil.

Examples of ultraviolet absorbents or light stabilizers include benzotriazole compounds, benzophenone compounds, salicylate compounds, cyanoacrylate compounds, benzoate compounds, oxalide compounds, hindered amine compounds and niccolates.

Examples of antioxidants include phenol compounds, phosphorus compounds, sulfur compounds and thioether compounds.

Examples of antibacterial/antifungal agents include 2-(4'-thiazolyl)-benzimidazole, 10,10'-oxybisphenoxarsine, N-(fluorodichloromethylthio)phthalimide and bis(2-pyridylthio-1-oxide)zinc.

Examples of flame retardants include halogen-containing compounds such as tetrabromobisphenol A derivatives, hexabromodiphenyl ether and tetrabromophthalic anhydride; phosphorus-containing compounds such as triphenyl phosphate, triphenyl phosphite, red phosphorus and ammonium polyphosphate; nitrogen-containing compounds such as urea and guanidine; silicon-containing compounds such as silicone oil, organic silane and aluminum silicate; and antimony compounds such as antimony trioxide and antimony phosphate.

Molding of the colored composition of the present invention can be achieved by various ordinary means of molding. For example, a colored pellet of the colored composition of the present invention can be molded using a processing machine such as an extruder, injection molding machine or roll mill. It is also possible to blend pellets or powder of a thermoplastic resin, the granulated colorant or high-concentration master batch of the present invention, and, if necessary, various additives, in an appropriate mixer, and molding this colored composition. Any commonly used method of molding can be employed, e.g., injection molding, extrusion molding, compression molding, blow molding, vacuum molding, injection blow molding, rotation molding, calender molding, and solution casting.

EXAMPLES

The present invention is hereinafter described in more detail by means of the following Examples, which, however, are not to be construed as limiting the scope of the invention. In the description below, "part(s) by weight" is abbreviated as "part(s)".

Examples 1 to 10 and Comparative Examples 1 to 6 pertain to granulated colorants and master batches.

Example 1

(1) Production of Granulated Colorant (Nigrosine Dye: Water=100:35)

After 2000 g of Nigrosine Base SAP (name of a product manufactured by Orient Chemical Industries, Ltd.; a nigrosine dye as C.I. Solvent Black 7, having a specific surface area of 3.50 m$^2$/g, an average particle diameter of 7 μm, an Fe content of 6000 ppm, an aniline content of 1.50% by weight, a nitrobenzene content of 0.1% by weight, and a product pH of 5.1) and 700 g of water were blended in a kneader for 3 minutes, the blend was removed.

This blend was subjected to extrusion granulation treatment using an extrusion granulating machine (Disc Pelletter F-5 model, a commercial product manufactured by DALTON Corporation) with a selected disc die opening diameter of 3 mm, while adjusting the roller revolution speed (120 rpm) and keeping a constant roller pressure (100 kg/cm$^2$), to yield a wet colorant comprising a cylindrical pellet (granulation product) and partially ungranulated material. This pellet was removed and its hardness was determined to be 4.9 N using a hardness meter (KIYA type hardness meter: WPF1600). The bulk density of the granulation product was 0.64 g/ml.

The wet colorant obtained was dried at 70° C. for 5 hours to yield a colorant comprising 86% by weight of a cylindrical pellet. The colorant obtained was sieved to yield a cylindrical pellet of ø2.92 mm×9.23 mm (granulated colorant A-1). The hardness of the cylindrical pellet was determined to be 9.8 N using a hardness meter (KIYA type hardness meter: WPF1600). The bulk density of the granulation product was 0.50 g/ml.

(2) Production of Master Batch (Nigrosine Dye: Resin=30:70)

30 parts of granulated colorant A-1 and 70 parts of polyamide 6 resin (ZYTEL [registered trademark] 7331 JNC: name of a product manufactured to by DuPont) were blended in a small tumbler. When a master batch was prepared from this blend using a twin-screw extruder (manufactured by PLABOR Co., Ltd., model BT-30-S2-42L), the entire volume was successfully processed with no problems concerning feed measuring and stranding. After the stranding, the master batch was cooled in a water chamber, then cut into specified length using a pelletizer. The black master batch A-1 obtained was identified as pellets uniformly containing the nigrosine dye.

Example 2

(1) Production of Granulated Colorant (Nigrosine Dye: Water=100:35)

After 2000 g of Nigrosine Base SAP and 700 g of water were blended in a kneader for 3 minutes, the blend was removed. This blend was subjected to extrusion granulation treatment using an extrusion granulating machine (Disc Pelletter F-5 model) with a selected disc die opening diameter of 2 mm, while adjusting the roller revolution speed and keeping a constant roller pressure, to yield a wet colorant comprising a cylindrical pellet (granulation product) and partially ungranulated material. This pellet was removed and its hardness was determined to be 1.96 N using a hardness meter (KIYA type hardness meter: WPF1600). The bulk density of the granulation product was 0.59 g/ml.

The wet colorant obtained was dried at 70° C. for 5 hours to yield a colorant containing 80% by weight of a cylindrical pellet. The colorant obtained was sieved to yield a cylindrical pellet of ø1.92 mm×9.37 mm (granulated colorant A-2). The hardness of the cylindrical pellet was determined to be 3.92 N using a hardness meter (KIYA type hardness meter: WPF 1600).

(2) Production of Master Batch (Nigrosine Dye: Resin=50:50)

50 parts of granulated colorant A-2 and 50 parts of polyamide 66 resin (ZYTEL 101 NC010: name of a product manufactured by DuPont) were blended in a small tumbler. When a master batch was prepared from this blend using a twin-screw extruder (manufactured by PLABOR Co., Ltd., model BT-30-S2-42L), the entire volume was successfully processed with no problems concerning feed measuring and stranding. After the stranding, the master batch was cooled in a water chamber, then cut into specified length using a pelletizer. The black master batch A-2 obtained was identified as pellets uniformly containing the nigrosine dye.

Example 3

(1) Production of Granulated Colorant (Nigrosine Dye: Water=100:47.8)

After 2000 g of Nigrosine Base SAP and 950 g of water were blended in a kneader for 3 minutes, the blend was removed. This blend was subjected to extrusion granulation treatment using an extrusion granulating machine (Disc Pelletter F-5 model) with a selected disc die opening diameter of 5 mm, while adjusting the roller revolution speed and keeping a constant roller pressure, to yield a wet colorant comprising a cylindrical pellet (granulation product) and partially ungranulated material. This pellet was removed and its hardness was determined to be 6.86 N using a hardness meter (KIYA type hardness meter: WPF1600). The bulk density of the granulation product was 0.60 g/ml.

The wet colorant obtained was dried at 70° C. for 5 hours to yield a colorant comprising 78% by weight of a cylindrical pellet. The colorant obtained was sieved to yield a cylindrical pellet of ø4.93 mm×15.48 mm (granulated colorant A-3). The hardness of the cylindrical pellet was determined to be 8.82 N using a hardness meter (KIYA type hardness meter: WPF 1600). The bulk density of the granulation product was 0.48 g/ml.

50 parts of granulated colorant A-3 and 50 parts of polyamide 66 resin (ZYTEL 101 NC010: name of a product manufactured by DuPont) were blended in a small tumbler. When a master batch was prepared from this blend using a twin-screw extruder (manufactured by PLABOR Co., Ltd., model BT-30-S2-42L), the entire volume was successfully processed with no problems concerning feed measuring and stranding. After the stranding, the master batch was cooled in a water chamber, then cut into specified length using a pelletizer. The black master batch A-3 obtained was identified as pellets uniformly containing the nigrosine dye.

Example 4

(1) Production of Granulated Colorant (Nigrosine Dye: Water=100:25)

After 2000 g of Nigrosine Base SA (name of a product manufactured by Orient Chemical Industries, Ltd.; a nigrosine dye as C.I. Solvent Black 7, having a specific surface area of 3.35 $m^2/g$, an average particle diameter of 12 μm, an Fe content of 6100 ppm, an aniline content of 1.53% by weight, a nitrobenzene content of 0.1% by weight, and a product pH of 4.9) and 500 g of water were blended in a kneader for 3 minutes, the blend was removed. This blend was subjected to extrusion granulation treatment using an extrusion granulating machine (Disc Pelletter F-5 model) with a selected disc die opening diameter of 3 mm, while adjusting the roller revolution speed and keeping a constant roller pressure, to yield a wet colorant comprising a cylindrical pellet (granulation product) and partially to ungranulated material. This pellet was removed and its hardness was determined to be 6.66 N using a hardness meter (KIYA type hardness meter: WPF 1600). The bulk density of the granulation product was 0.57 g/ml. The wet colorant obtained was dried at 70° C. for 5 hours to yield a colorant comprising 88% by weight of a cylindrical pellet. The colorant obtained was sieved to yield a cylindrical pellet of ø2.96 mm×9.58 mm (granulated colorant A-4). The hardness of the cylindrical pellet was determined to be 12.35 N using a hardness meter (KIYA type hardness meter: WPF1600). The bulk density of the granulation product was 0.51 g/ml.

(2) Production of Master Batch (Nigrosine Dye: Resin=50: 50)

50 parts of granulated colorant A-4 and 50 parts of polyamide 66 resin (ZYTEL [registered trademark] 101 NC010: name of a product manufactured by DuPont) were blended in a small tumbler. When a master batch was prepared from this blend using a twin-screw extruder (manufactured by PLABOR Co., Ltd., model BT-30-S2-42L), the entire volume was successfully processed with no problems concerning feed measuring and stranding. After the stranding, the master batch was cooled in a water chamber, then cut into specified length using a pelletizer. The black master batch A-4 obtained was identified as pellets uniformly containing the nigrosine dye.

Example 5

(1) Production of Granulated Colorant (Nigrosine Dye: Water=100:42.5)

After 2000 g of Nigrosine Base SA and 850 g of water were blended in a kneader for 3 minutes, the blend was removed. This blend was subjected to extrusion granulation treatment using an extrusion granulating machine to (Disc Pelletter F-5 model) with a selected disc die opening diameter of 3 mm, while adjusting the roller revolution speed and keeping a constant roller pressure, to yield a wet colorant comprising a cylindrical pellet (granulation product) and partially ungranulated material. This pellet was removed and its hardness was determined to be 2.25 N using a hardness meter (KIYA type hardness meter: WPF1600). The bulk density of the granulation product was 0.55 g/ml.

The wet colorant obtained was dried at 70° C. for 5 hours to yield a colorant comprising 90% by weight of a cylindrical pellet. The colorant obtained was sieved to yield a cylindrical pellet of ø2.92 mm×9.47 mm (granulated colorant A-5). The hardness of the cylindrical pellet was determined to be 3.33 N using a hardness meter (KIYA type hardness meter: WPF1600). The bulk density of the granulation product was 0.44 g/ml.

(2) Production of Master Batch (Nigrosine Dye: Resin=50: 50)

50 parts of granulated colorant A-5 and 50 parts of polyamide 66 resin (ZYTEL 101 NC010) were blended in a small tumbler. When a master batch was prepared from this blend using a twin-screw extruder (manufactured by PLABOR Co., Ltd., model BT-30-S2-42L), the entire volume was successfully processed with no problems concerning feed measuring and stranding. After the stranding, the master batch was cooled in a water chamber, then cut into specified length using a pelletizer. The black master batch A-5 obtained was identified as pellets uniformly containing the nigrosine dye.

Example 6

(1) Production of Granulated Colorant (Nigrosine Dye: Water=100:53.5)

After 2000 g of Nigrosine Base SA and 1070 g of water were blended in a kneader for 3 minutes, the blend was removed. This blend was subjected to extrusion granulation treatment using an extrusion granulating machine (Disc Pelletter F-5 model) with a selected disc die opening diameter of 3 mm, while adjusting the roller revolution speed and keeping a constant roller pressure, to yield a wet colorant comprising a cylindrical pellet (granulation product) and partially ungranulated material. This pellet was removed and its hardness was determined to be 0.98 N using a hardness meter (KIYA type hardness meter: WPF1600). The bulk density of the granulation product was 0.52 g/ml.

The wet colorant obtained was dried at 70° C. for 5 hours to yield a colorant comprising 92% by weight of a cylindrical pellet. The colorant obtained was sieved to yield a cylindrical pellet of ø2.61 mm×8.79 mm (granulated colorant A-6). The hardness of the cylindrical pellet was determined to be 1.08 N using a hardness meter (KIYA type hardness meter: WPF1600). The bulk density of the granulation product was 0.40 g/ml.

(2) Production of Master Batch (Nigrosine Dye: Resin=50: 50)

50 parts of granulated colorant A-6 and 50 parts of polyamide 66 resin (ZYTEL 101 NC010) were blended in a small tumbler. When a master batch was prepared from this blend using a twin-screw extruder (manufactured by PLABOR Co., Ltd., model BT-30-S2-42L), the entire volume was successfully processed with no problems concerning feed measuring and stranding. After the stranding, the master batch was cooled in a water chamber, then cut into specified length using a pelletizer. The black master batch A-6 obtained was identified as pellets uniformly containing the nigrosine dye.

Example 7

(1) Production of Granulated Colorant (Nigrosine Dye: Water=100:35)

After 2000 g of Spirit Black AB (name of a product manufactured by Orient Chemical Industries, Ltd.; a nigrosine dye as C.I. Solvent Black 5, having a specific surface area of 3.59 $m^2/g$, an average particle diameter of 7 μm, an Fe content of 7000 ppm, an aniline content of 1.8% by weight, a nitrobenzene content of trace, and a product pH of 4.0) and 700 g of water were blended in a kneader for 3 minutes, the blend was removed. This blend was subjected to extrusion granulation treatment using an extrusion granulating machine (Disc Pelletter F-5 model) with a selected disc die opening diameter of 3 mm, while adjusting the roller revolution speed and keeping a constant roller pressure, to yield a wet colorant comprising a cylindrical pellet (granulation product) and partially ungranulated material. This pellet was removed and its hardness was determined to be 6.47 N using a hardness meter (KIYA type hardness meter: WPF1600). The bulk density of the granulation product was 0.56 g/ml.

The wet colorant obtained was dried at 70° C. for 5 hours to yield a colorant comprising 89% by weight of a cylindrical pellet. The colorant obtained was sieved to yield a cylindrical pellet of ø2.95 mm×9.12 mm (granulated colorant A-7). The hardness of the cylindrical pellet was determined to be 8.13 N using a hardness meter (KIYA type hardness meter: WPF1600). The bulk density of the granulation product was 0.49 g/ml.

(2) Production of Master Batch (Nigrosine Dye: Resin=30:70)

30 parts of granulated colorant A-7 and 70 parts of polyamide 66 resin (ZYTEL 101 NC010) were blended in a small tumbler. When a master batch was prepared from this blend using a twin-screw extruder (manufactured by PLABOR Co., Ltd., model BT-30-S2-42L), the entire volume was successfully processed with no problems concerning feed measuring and stranding. After the stranding, the master batch was cooled in a water chamber, then cut into specified length using a pelletizer. The black master batch A-7 obtained was identified as pellets uniformly containing the nigrosine dye.

Example 8

(1) Production of Granulated Colorant (Nigrosine Dye: Water=100:35)

After 2000 g of Nigrosine Base EEL (name of a product manufactured by Orient Chemical Industries, Ltd.; a nigrosine dye as C.I. Solvent Black 7, having a specific surface area of 3.83 m²/g, an average particle diameter of 12 μm, an Fe content of 5000 ppm, an aniline content of 0.15% by weight, a nitrobenzene content of trace, and a product pH of 7.3) and 700 g of water were blended in a kneader for 3 minutes, the blend was removed. This blend was subjected to extrusion granulation treatment using an extrusion granulating machine (Disc Pelletter F-5 model) with a selected disc die opening diameter of 3 mm, while adjusting the roller revolution speed and keeping a constant roller pressure, to yield a wet colorant comprising a cylindrical pellet (granulation product) and partially ungranulated material. This pellet was removed and its hardness was determined to be 1.86 N using a hardness meter (KIYA type hardness meter: WPF1600). The bulk density of the granulation product was 0.54 g/ml.

The wet colorant obtained was dried at 70° C. for 5 hours to yield a colorant comprising 74% by weight of a cylindrical pellet. The colorant obtained was sieved to yield a cylindrical pellet of ø2.96 mm×8.11 mm (granulated colorant A-8). The hardness of the cylindrical pellet was determined to be 4.02 N using a hardness meter (KIYA type hardness meter: WPF 1600). The bulk density of the granulation product was 0.44 g/ml.

(2) Production of Master Batch (Nigrosine Dye: Resin=50:50)

50 parts of granulated colorant A-8 and 50 parts of polyamide 6 resin (ZYTEL 7331 JNC) were blended in a small tumbler. When a master batch was prepared from this blend using a twin-screw extruder (manufactured by PLABOR Co., Ltd., model BT-30-S2-42L), the entire volume was successfully processed with no problems concerning feed measuring and stranding. After the stranding, the master batch was cooled in a water chamber, then cut into specified length using a pelletizer. The black master batch A-8 obtained was identified as pellets uniformly containing the nigrosine dye.

Example 9

(1) Production of Granulated Colorant (Nigrosine Dye: Water=100:35)

After 2000 g of Nigrosine Base EX (name of a product manufactured by Orient Chemical Industries, Ltd.; a nigrosine dye as C.I. Solvent Black 7, having a specific surface area of 3.39 m²/g, an average particle diameter of 12 μm, an Fe content of 2000 ppm, an aniline content of 0.06% by weight, a nitrobenzene content of trace, and a product pH of 6.9) and 700 g of water were blended in a kneader for 3 minutes, the blend was removed. This blend was subjected to extrusion granulation treatment using an extrusion granulating machine (Disc Pelletter F-5 model) with a selected disc die opening diameter of 3 mm, while adjusting the roller revolution speed and keeping a constant roller pressure, to yield a wet colorant comprising a cylindrical pellet (granulation product) and partially ungranulated material. This pellet was removed and its hardness was determined to be 5.59 N using a hardness meter (KIYA type hardness meter: WPF1600). The bulk density of the granulation product was 0.61 g/ml.

The wet colorant obtained was dried at 70° C. for 5 hours to yield a colorant comprising 92% by weight of a cylindrical pellet. The colorant obtained was sieved to yield a cylindrical pellet of ø3.02 mm×8.66 mm (granulated colorant A-9). The hardness of the cylindrical pellet was determined to be 7.74 N using a hardness meter (KIYA type hardness meter: WPF 1600). The bulk density of the granulation product was 0.53 g/ml.

(2) Production of Master Batch (Nigrosine Dye: Resin=50:50)

50 parts of granulated colorant A-9 and 50 parts of polyamide 66 resin (ZYTEL 101 NC010) were blended in a small tumbler. When a master batch was prepared from this blend using a twin-screw extruder (manufactured by PLABOR Co., Ltd., model BT-30-S2-42L), the entire volume was successfully processed with no problems concerning feed measuring and stranding. After the stranding, the master batch was cooled in a water chamber, then cut into specified length using a pelletizer. The black master batch A-9 obtained was identified as pellets uniformly containing the nigrosine dye.

Example 10

(1) Production of Granulated Colorant

As a result of treatment of 2000 g of Nigrosine Base SAP using a dry granulating machine (Roller Compacter model WP 160×60; manufactured by MATSUBO Corporation), a colorant containing 87% by weight of a good flaky product of 0.25 to 4 mm was obtained. The colorant obtained was sieved to yield a flaky product (granulated colorant A-10).

(2) Production of Master Batch (Nigrosine Dye: Resin=30:70)

30 parts of granulated colorant A-10 and 70 parts of polyamide 6 resin (ZYTEL 7331 JNC) were blended in a small tumbler. When a master batch was prepared from this blend using a twin-screw extruder (manufactured by PLABOR Co., Ltd., model BT-30-S2-42L), the entire volume was successfully processed with no problems concerning feed measuring and stranding. After the stranding, the master batch was cooled in a water chamber, then cut into specified length using a pelletizer. The black master batch A-10 obtained was identified as pellets uniformly containing the nigrosine dye.

(3) Production of Master Batch (Nigrosine Dye: Resin=30:70)

30 parts of granulated colorant A-10 and 70 parts of polyamide 66 resin (ZYTEL 101 NC010) were blended in a small tumbler. When a master batch was prepared from this blend using a twin-screw extruder (manufactured by PLABOR Co., Ltd., model BT-30-S2-42L), the entire volume was successfully processed with no problems concerning feed measuring and stranding. After the stranding, the master batch was cooled in a water chamber, then cut into specified length using a pelletizer. The black master batch A-10B obtained was identified as pellets uniformly containing the nigrosine dye.

Example 11

(1) Production of Granulated Colorant (Nigrosine Dye: Water=100:35)

After 2000 g of Nigrosine Base SAP and 700 g of water were blended in a kneader for 3 minutes, the blend was removed. This blend was subjected to extrusion granulation treatment using an extrusion granulating machine (Disc Pelletter F-5 model) with a selected disc die opening diameter of 3 mm, while adjusting the roller revolution speed and keeping a constant roller pressure, to yield a wet colorant comprising a cylindrical pellet (granulation product) and partially ungranulated material. This pellet was removed and its hardness was determined to be 5.11 N using a hardness meter (KIYA type hardness meter: WPF1600). The bulk density of the granulation product was 0.62 g/ml.

The wet colorant obtained was dried at 70° C. for 5 hours to yield a colorant A-11 comprising 87% by weight of a cylindrical pellet (granulated colorant). This pellet was removed and determined to be a cylindrical pellet of ø2.93 mm×9.28 mm having a hardness of 9.71 N. The bulk density of the granulation product was 0.51 g/ml.

(2) Production of Master Batch (Nigrosine Dye: Resin=30:70)

30 parts of colorant A-11 and 70 parts of polyamide 6 resin (ZYTEL [registered trademark] 7331 JNC: name of a product manufactured by DuPont) were blended in a small tumbler. When a master batch was prepared from this blend using a twin-screw extruder (manufactured by PLABOR Co., Ltd., model BT-30-S2-42L), the entire volume was successfully processed with no problems concerning feed measuring and stranding. After the stranding, the master batch was cooled in a water chamber, then cut into specified length using a pelletizer. The black master batch A-11 obtained was identified as pellets uniformly containing the nigrosine dye.

Example 12

(1) Production of Granulated Colorant

As a result of treatment of 2000 g of Nigrosine Base SAP using a dry granulating machine (Roller Compacter model WP 160×60; manufactured by MATSUBO Corporation), a colorant A-12 comprising 85% by weight of a good flaky product of 0.25 to 4 mm (granulated colorant) was obtained.

(2) Production of Master Batch (Nigrosine Dye: Resin=30:70)

30 parts of colorant A-12 and 70 parts of polyamide 6 resin (ZYTEL 7331 JNC) were blended in a small tumbler. When a master batch was prepared from this blend using a twin-screw extruder (manufactured by PLABOR Co., Ltd., model BT-30-S2-42L), the entire volume was successfully processed with no problems concerning feed measuring and stranding. After the stranding, the master batch was cooled in a water chamber, then cut into specified length using a pelletizer. The black master batch A-12 obtained was identified as pellets uniformly containing the nigrosine dye.

Example 13

(1) Production of Granulated Colorant (Colorant: Water=100:35)

After 1500 g of Nigrosine Base SAP, 500 g of carbon black (#960B, manufactured by Mitsubishi Chemical Corporation) and 700 g of water were blended in a kneader for 3 minutes, the blend was removed. This blend was subjected to extrusion granulation treatment using an extrusion granulating machine (Disc Pelletter F-5 model) with a selected disc die opening diameter of 3 mm, while adjusting the roller revolution speed and keeping a constant roller pressure, to yield a wet colorant comprising a cylindrical pellet (granulation product) and partially ungranulated material. This pellet was removed and its hardness was determined to be 5.78 N using a hardness meter (KIYA type hardness meter: WPF1600). The bulk density of the granulation product was 0.65 g/ml.

The wet colorant obtained was dried at 70° C. for 5 hours to yield a colorant comprising 97.3% by weight of a cylindrical pellet. The colorant obtained was sieved to yield a cylindrical pellet of ø2.99 mm×9.35 mm (granulated colorant A-13). The hardness of the cylindrical pellet was determined to be 4.31 N using a hardness meter (KIYA type hardness meter: WPF1600). The bulk density of the granulation product was 0.57 g/ml.

(2) Production of Master Batch (Colorant: Resin=50:50)

50 parts of granulated colorant A-13 and 50 parts of polyamide 6 resin (ZYTEL 7331 JNC) were blended in a small tumbler. When a master batch was prepared from this blend using a twin-screw extruder (manufactured by PLABOR Co., Ltd., model BT-30-S2-42L), the entire volume was successfully processed with no problems concerning feed measuring and stranding. After the stranding, the master batch was cooled in a water chamber, then cut into specified length using a pelletizer. The black master batch A-13 obtained was identified as pellets uniformly containing the nigrosine dye and carbon black.

Example 14

(1) Production of Granulated Colorant (Colorant: Water=100:42.5)

After 1500 g of Nigrosine Base SAP, 500 g of carbon black (#960B, manufactured by Mitsubishi Chemical Corporation) and 850 g of water were blended in a kneader for 3 minutes, the blend was removed. This blend was subjected to extrusion granulation treatment using an extrusion granulating machine (Disc Pelletter F-5 model) with a selected disc die opening diameter of 3 mm, while adjusting the roller revolution speed and keeping a constant roller pressure, to yield a wet colorant comprising a cylindrical pellet (granulation product) and partially ungranulated material. This pellet was removed and its hardness was determined to be 3.63 N using a hardness meter (KIYA type hardness meter: WPF1600). The bulk density of the granulation product was 0.63 g/ml.

The wet colorant obtained was dried at 70° C. for 5 hours to yield a colorant A-14 comprising 99.2% by weight of a cylindrical pellet (granulated colorant). This pellet was removed and determined to be a cylindrical pellet of ⌀2.98 mm×9.32 mm. The hardness of the cylindrical pellet was determined to be 3.04 N using a hardness meter (KIYA type hardness meter: WPF 1600). The bulk density of the granulation product was 0.54 g/ml.

(2) Production of Master Batch (Colorant: Resin=50:50)

50 parts of colorant A-14 and 50 parts of polyamide 66 resin (ZYTEL 101 NC010) were blended in a small tumbler. When a master batch was prepared from this blend using a twin-screw extruder (manufactured by PLABOR Co., Ltd., model BT-30-S2-42L), the entire volume was successfully processed with no problems concerning feed measuring and stranding. After the stranding, the master batch was cooled in a water chamber, then cut into specified length using a pelletizer. The black master batch A-14 obtained was identified as pellets uniformly containing the nigrosine dye and carbon to black.

Example 15

(1) Production of Granulated Colorant (Colorant: Water=100:35)

After 2000 g of Nigrosine Base SAP, 60 g of PEG200 (polyethylene glycol, average molecular weight 200) and 700 g of water were blended in a kneader for 3 minutes, the blend was removed. This blend was subjected to extrusion granulation treatment using an extrusion granulating machine (Disc Pelletter F-5 model) with a selected disc die opening diameter of 3 mm, while adjusting the roller revolution speed and keeping a constant roller pressure, to yield a wet colorant comprising a cylindrical pellet (granulation product) and partially ungranulated material. This pellet was removed and its hardness was determined to be 2.02 N using a hardness meter (KIYA type hardness meter: WPF1600). The bulk density of the granulation product was 0.52 g/ml.

The wet colorant obtained was dried at 70° C. for 5 hours to yield a colorant comprising 99.5% by weight of a cylindrical pellet. The colorant obtained was sieved to yield a cylindrical pellet of ⌀2.98 mm×9.25 mm (granulated colorant A-15). The hardness of the cylindrical pellet was determined to be 2.55 N using a hardness meter (KIYA type hardness meter: WPF1600). The bulk density of the granulation product was 0.45 g/ml.

(2) Production of Master Batch (Colorant: Resin=50:50)

50 parts of granulated colorant A-15 and 50 parts of polyamide 66 resin (ZYTEL 101 NC010) were blended in a small tumbler. When a master batch was prepared from this blend using a twin-screw extruder (manufactured by PLABOR Co., Ltd., model BT-30-S2-42L), the entire volume was successfully processed with no problems concerning feed measuring and stranding. After the stranding, the master batch was cooled in a water chamber, then cut into specified length using a pelletizer. The black master batch A-15 obtained was identified as pellets uniformly containing the nigrosine dye and carbon black.

Example 16

(1) Production of Granulated Colorant (Nigrosine Dye: Water=100:35)

After 2000 g of Nigrosine Base SAP, 20 g of NOIGEN XL-40 (polyoxyalkylene alkyl ether nonionic surfactant) and 700 g of water were blended in a kneader for 3 minutes, the blend was removed. This blend was subjected to extrusion granulation treatment using an extrusion granulating machine (Disc Pelletter F-5 model) with a selected disc die opening diameter of 3 mm, while adjusting the roller revolution speed and keeping a constant roller pressure, to yield a wet colorant comprising a cylindrical pellet (granulation product) and partially ungranulated material. This pellet was removed and its hardness was determined to be 8.73 N using a hardness meter (KIYA type hardness meter: WPF1600). The bulk density of the granulation product was 0.54 g/ml.

The wet colorant obtained was dried at 70° C. for 5 hours to yield a colorant comprising 92.7% by weight of a cylindrical pellet. The colorant obtained was sieved to yield a cylindrical pellet of ⌀2.97 mm×9.32 mm (granulated colorant A-16). The hardness of the cylindrical pellet was determined to be 10.98 N using a hardness meter (KIYA type hardness meter: WPF1600). The bulk density of the granulation product was 0.48 g/ml.

(2) Production of Master Batch (Nigrosine Dye: Resin=50:50)

50 parts of granulated colorant A-16 and 50 parts of polyamide 66 resin (ZYTEL 101 NC010) were blended in a small tumbler. When a master batch was prepared from this blend using a twin-screw extruder (manufactured by PLABOR Co., Ltd., model BT-30-S2-42L), the entire volume was successfully processed with no problems concerning feed measuring and stranding. After the stranding, the master batch was cooled in a water chamber, then cut into specified length using a pelletizer. The black master batch A-16 obtained was identified as pellets uniformly containing the nigrosine dye.

Comparative Example 1

(1) Production of Master Batch (Nigrosine Dye: Resin=30:70)

30 parts of Nigrosine Base SAP and 70 parts of polyamide 6 resin (ZYTEL 7331 JNC) were blended in a small tumbler. When a master batch was prepared from this blend using a twin-screw extruder (manufactured by PLABOR Co., Ltd., model BT-30-S2-42L), the blend formed bridges in the feed hopper to make its feed unstable, and the molded product strand was in a very bad condition, including ununiform thickness and strand breaks. The master batch obtained by cutting the molded product obtained using the twin-screw extruder into specified length was unstable in shape; various shapes of pellets (black master batch B-1) were obtained.

Comparative Example 2

(1) Production of Master Batch (Nigrosine Dye: Resin=50:50)

50 parts of Nigrosine Base SAP and 50 parts of polyamide 6 resin (ZYTEL 7331 JNC) were blended in a small tumbler. When a master batch was prepared from this blend using a twin-screw extruder (manufactured by PLABOR Co., Ltd., model BT-30-S2-42L), the blend formed bridges in the feed hopper to make its feed unstable, and the molded product strand was in a very bad condition, including ununiform thickness and strand breaks. The production was discontinued since the feed became impossible during the operation.

Comparative Example 3

(1) Production of Master Batch (Nigrosine Dye: Resin=30:70)

30 parts of Nigrosine Base SAP and 70 parts of polyamide 66 resin (ZYTEL 101 NC010) were blended in a small tumbler. When a master batch was prepared from this blend using a twin-screw extruder (manufactured by PLABOR Co., Ltd., model BT-30-S2-42L), the blend formed bridges in the feed hopper to make its feed unstable, and the molded product strand was in a very bad condition, including ununiform thickness and strand breaks. The master batch obtained by cutting the molded product obtained using the twin-screw extruder into specified length was unstable in shape; various shapes of pellets (black master batch B-2) were obtained.

Comparative Example 4

(1) Production of Master Batch (Nigrosine Dye: Resin=50: 50)

50 parts of Nigrosine Base SAP and 50 parts of polyamide 66 resin (ZYTEL 101 NC010) were blended in a small tumbler. When a master batch was prepared from this blend using a twin-screw extruder (manufactured by PLABOR Co., Ltd., model BT-30-S2-42L), the blend formed bridges in the feed hopper to make its feed unstable, and the molded product strand was in a very bad condition, including ununiform thickness and strand breaks. The production was discontinued since the feed became impossible during the operation.

Comparative Example 5

(1) Production of Master Batch (Nigrosine Dye: Resin=40: 60)

40 parts of Nigrosine Base SAP and 60 parts of polyamide 6 resin (ZYTEL 7331 JNC) were blended in a small tumbler. When a master batch was prepared from this blend using a twin-screw extruder (manufactured by PLABOR Co., Ltd., model BT-30-S2-42L), the blend formed bridges in the feed hopper to make its feed unstable, and the molded product strand was in a very bad condition, including ununiform thickness and strand breaks. The master batch obtained by cutting the molded product obtained using the twin-screw extruder into specified length was unstable in shape; various shapes of pellets (black master batch C-1) were obtained.

Comparative Example 6

(1) Production of Master Batch (Nigrosine Dye: Resin=40: 60)

40 parts of Nigrosine Base SAP and 60 parts of polyamide 66 resin (ZYTEL 101 NC010) were blended in a small tumbler. When a master batch was prepared from this blend using a twin-screw extruder (manufactured by PLABOR Co., Ltd., model BT-30-S2-42L), the blend formed bridges in the feed hopper to make its feed unstable, and the molded product strand was in a very bad condition, including ununiform thickness and strand breaks. The master batch obtained by cutting the molded product obtained using the twin-screw extruder into specified length was unstable in shape; various shapes of pellets (black master batch C-2) were obtained.

Example 17

(a) Fluidity Test Using Powder Fluidity Analyzer

A fluidity comparison test was performed using the granulated colorant A-1 obtained in Example 1, the granulated colorant A-10 obtained in Example 10, and the raw material Nigrosine Base SAP.

Instrument used: powder fluidity analyzer FT-4 (manufactured by Sysmex Corporation)

Measuring conditions: flow rate test

Flow rate test: Changes in fluidity at four different blade speeds (100 mm/sec, 70 mm/sec, 40 mm/sec, 10 mm/sec) were evaluated. The results are shown in Table 1 and FIG. 1. As the rate of the figure changes shown in Table 1 and FIG. 1 decreases, the fluidity is evaluated to be better.

TABLE 1

Figure 1:
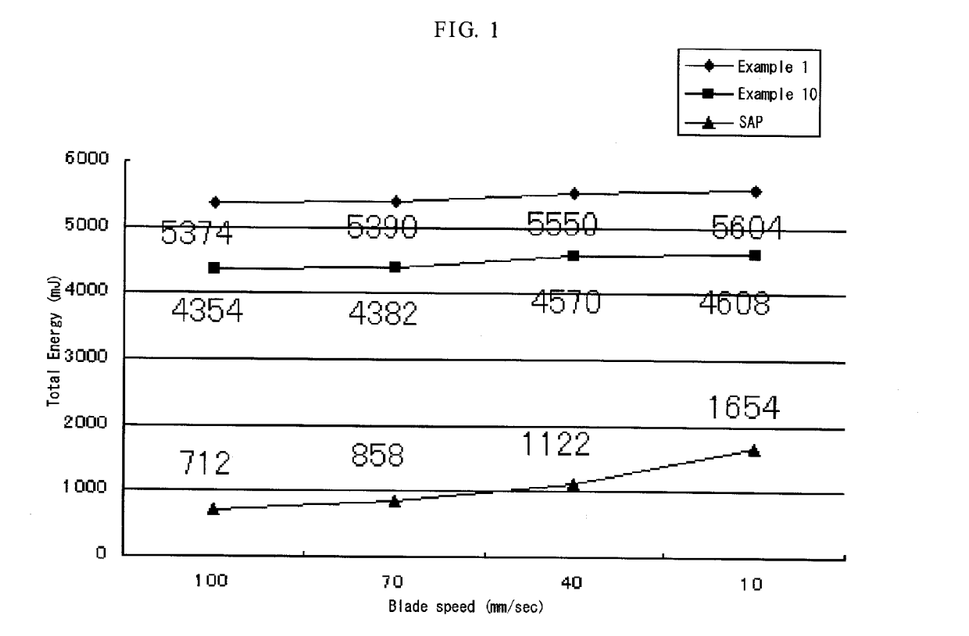
FIG. 1 is a graph showing the results of a fluidity test using a powder fluidity analyzer.

| Blade speed | Granulated colorant A-1 | Granulated colorant A-10 | Nigrosine Base SAP |
|---|---|---|---|
| 100 mm/sec | 5374 | 4354 | 712 |
| 70 mm/sec | 5390 | 4382 | 858 |
| 40 mm/sec | 5550 | 4570 | 1122 |
| 10 mm/sec | 5604 | 4608 | 1654 |

As a result of the above-described flow rate test, granulated colorant A-1 and granulated colorant A-10 exhibited constant fluidity independent of the changes in flow rate (blade speed). Because Nigrosine Base SAP is powdery and hence has small particle-to-particle gaps, it is speculated that the lower portion of the sample is compacted in the container due to the weight of the upper portion of the sample; if the blade speed is slow, this compaction proceeds to increase the resistance of the lower portion of the sample, which is considered to be among the causes of the fluidity reduction.

(b) Fluidity Test Using Simple Fluidity Tester

Figure 2:
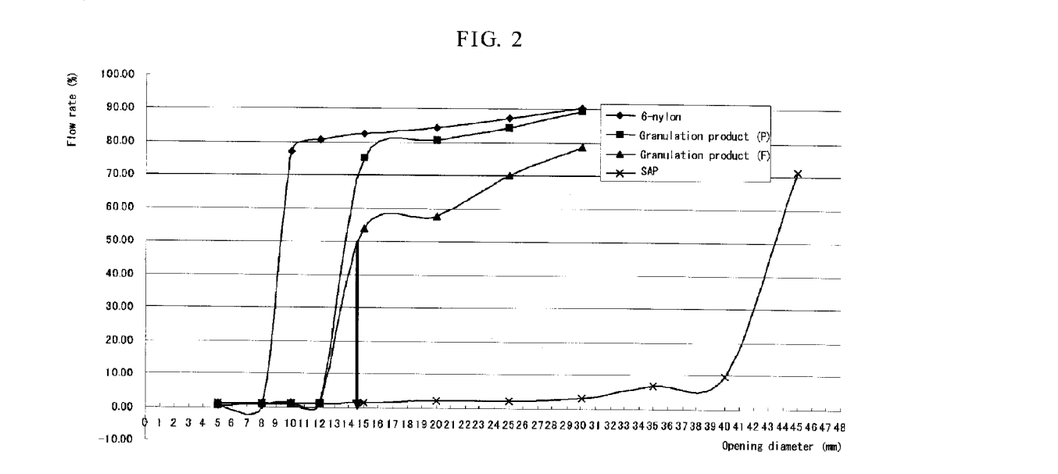
FIG. 2 is a graph showing the results of a fluidity test using a simple fluidity tester.

Test method: A simple fluidity tester having an opening with a shutter capable of forming a circular opening permitting adjustment of the diameter thereof at the center of the base of a 300-ml cylindrical container was used. After the sample was filled in the simple fluidity tester with the shutter closed, the shutter was gradually opened, and the portion of the sample fallen for each opening diameter was weighed. The measured results are shown in Table 2 and FIG. 2. Both PA resin in Table 2 and 6-nylon in FIG. 2 refer to polyamide 6 resin.

TABLE 2

| | Opening diameter (mm) | | | | | | | | | | |
|---|---|---|---|---|---|---|---|---|---|---|---|
| | 5 | 8 | 10 | 12 | 15 | 20 | 25 | 30 | 35 | 40 | 45 |
| PA resin (g) | 0.42 | 0.56 | 77.06 | 80.49 | 82.48 | 84.53 | 87.23 | 90.36 | — | — | — |
| Granulated colorant A-1 (g) | 0.48 | 0.69 | 0.69 | 1.12 | 75.35 | 80.73 | 84.57 | 89.59 | — | — | — |
| Granulated colorant A-10 (g) | 1.00 | 1.00 | 1.42 | 1.42 | 53.83 | 57.57 | 70.17 | 78.71 | — | — | — |
| Nigrosine Base SAP (g) | 1.01 | 1.01 | 1.01 | 1.01 | 1.51 | 2.22 | 2.22 | 3.06 | 6.79 | 9.83 | 71.38 |

Based on these results of the fluidity determination, an approximation curve were generated to obtain equations showing the relationship between opening diameter (abscissa: x) and the ratio by weight of the portion of sample fallen to the entire sample (ordinate: y), and the opening diameter corresponding to a fall of 50% by weight of the sample quantity filling in the simple fluidity tester, $x_{50}$, was calculated. As the opening diameter $x_{50}$ decreases, the fluidity is evaluated to be better.

The equations showing the relationship between opening diameter (abscissa: x) and the ratio by weight of the portion of sample fallen to the entire sample (ordinate: y) and the opening diameter corresponding to a fall of 50% by weight of the sample quantity, $x_{50}$, for each sample are shown below.

Polyamide 6 resin: $y=38.251x-305.45$
(If y=50, $x_{50}$=9.29 mm)
Granulated colorant A-1: $y=24.744x-295.82$
(If y=50, $x_{50}$=13.9 mm)
Granulated colorant A-10: $y=17.469x-208.20$
(If y=50, $x_{50}$=14.7 mm)
Nigrosine Base SAP: $y=12.309x-482.53$
(If Y=50, $x_{50}$=43.3 Mm)

As shown above, the fluidities of granulated colorant A-1 and granulated colorant A-10 were relatively close to the fluidity of polyamide 6 resin, whereas the fluidity of Nigrosine Base SAP, which is a powdery nigrosine, was much inferior to the fluidities of granulated colorant A-1 and granulated colorant A-10. Comparing the fluidities of granulated colorant A-1, which is in the form of a cylindrical pellet, and granulated colorant A-10, which is in the form of a flake, granulated colorant A-1 exhibited better fluidity. Examples A and B and Comparative Examples A and B pertain to non-reinforced black polyamide resin compositions.

Example A 1000 g of polyamide 66 resin (ZYTEL 101L-NC10: name of a product manufactured by DuPont) and 2.0 g of granulated colorant A-1 (Example 1) were placed in a stainless steel tumbler and vigorously stirred for 20 minutes.

The mixture obtained was kneaded in a molten state at 300° C. using a vent type extruding machine (manufactured by Enpura Sangyo, product name: E30SV) and treated by a conventional method to yield colored pellets, which were vacuum-dried at 120° C. for 6 hours. After drying, the pellets were molded into a test plate at 280 to 300° C. by an ordinary method using an injection molding machine (produced by Kawaguchi Tekko, product name: KM50-C). A bluish black molded test plate with good compatibility between the resin and the dye [48×86×3 (mm)] was obtained.

Example B 1000 g of polyamide 66 resin (ZYTEL 101L-NC10) and 6.7 g of black master batch A-1 (Example 1) were placed in a stainless steel tumbler and vigorously stirred for 20 minutes.

The mixture obtained was kneaded in a molten state at 300° C. using a vent type extruding machine (manufactured by Enpura Sangyo, product name: E30SV) and treated by a conventional method to yield colored pellets, which were vacuum-dried at 120° C. for 6 hours. After drying, the pellets were molded into a test plate at 280 to 300° C. by an ordinary method using an injection molding machine (produced by Kawaguchi Tekko, product name: to KM50-C). A bluish black molded test plate with good compatibility between the resin and the dye [48×86×3 (mm)] was obtained.

Comparative Example A 1000 g of polyamide 66 resin (ZYTEL 101L-NC10) and 2.0 g of Nigrosine Base SAP were placed in a stainless steel tumbler and vigorously stirred for 20 minutes.

The mixture obtained was kneaded in a molten state at 300° C. using a vent type extruding machine (manufactured by Enpura Sangyo, product name: E30SV) and treated by a conventional method to yield colored pellets, which were vacuum-dried at 120° C. for 6 hours. After drying, the pellets were molded into a test plate at 280 to 300° C. by an ordinary method using an injection molding machine (produced by Kawaguchi Tekko, product name: KM50-C). A bluish black molded test plate with good compatibility between the resin and the dye [48×86×3 (mm)] was obtained.

Comparative Example B 1000 g of polyamide 66 resin (ZYTEL 101L-NC10) and 6.7 g of black master batch B-2 (Comparative Example 3) were placed in a stainless steel tumbler and vigorously stirred for 20 minutes.

The mixture obtained was kneaded in a molten state at 300° C. using a vent type extruding machine (manufactured by Enpura Sangyo, product name: E30SV) and treated by a conventional method to yield colored pellets, which were vacuum-dried at 120° C. for 6 hours. After drying, the pellets were molded into a test plate at 280 to 300° C. by an ordinary method using an injection molding machine (produced by Kawaguchi Tekko, product name: KM50-C). A bluish black molded test plate with good compatibility between the resin and the dye [48×86×3 (mm)] was obtained.

Examples C and D and Comparative Examples C and D pertain to glass fiber-reinforced black polyamide resin compositions.

Example C 500 g of glass fiber-reinforced polyamide 66 resin (ZYTEL [registered trademark] 70G-33L: name of a product manufactured by DuPont) and 1.0 g of granulated colorant A-1 (Example 1) were placed in a stainless steel tumbler and vigorously stirred for 1 hour.

The mixture obtained was kneaded in a molten state at 300° C. using a vent type extruding machine (manufactured by Enpura Sangyo, product name: E30SV) and treated by a conventional method to yield colored pellets, which were vacuum-dried at 120° C. for 6 hours. After drying, the pellets were molded into a test plate at 280 to 300° C. by an ordinary method using an injection molding machine (produced by Kawaguchi Tekko, product name: KM50-C). A bluish black molded test plate with good compatibility between the resin and the dye [48×86×3 (mm)] was obtained. The same treatment was performed but the mold was replaced with a mold for Izod impact test pieces, to obtain an Izod impact test piece.

Example D 500 g of glass fiber-reinforced polyamide 66 resin (manufactured by DuPont, product name: ZYTEL 70G-33L) and 3.34 g of black master batch A-1 (Example 1) were placed in a stainless steel tumbler and vigorously stirred for 1 hour.

The mixture obtained was kneaded in a molten state at 300° C. using a vent type extruding machine (manufactured by Enpura Sangyo, product name: E30SV) and treated by a conventional method to yield colored pellets, which were vacuum-dried at 120° C. for 6 hours. After drying, the pellets were molded into a test plate at 280 to 300° C. by an ordinary method using an injection molding machine (produced by Kawaguchi Tekko, product name: KM50-C). A bluish black molded test plate with good compatibility between the resin and the dye [48×86×3 (mm)] was obtained. The same treatment was performed but the mold was replaced with a mold for Izod impact test pieces, to obtain an Izod impact test piece.

Comparative Example C 500 g of glass fiber-reinforced polyamide 66 resin (ZYTEL 70G-33L) and 1.0 g of Nigrosine Base SAP were placed in a stainless steel tumbler and vigorously stirred for 1 hour.

The mixture obtained was kneaded in a molten state at 300° C. using a vent type extruding machine (manufactured by Enpura Sangyo, product name: E30SV) and treated by a conventional method to yield colored pellets, which were vacuum-dried at 120° C. for 6 hours. After drying, the pellets were molded into a test plate at 280 to 300° C. by an ordinary method using an injection molding machine (produced by Kawaguchi Tekko, product name: KM50-C). A bluish black molded test plate with good compatibility between the resin and the dye [48×86×3 (mm)] was obtained. The same treatment was performed but the mold was replaced with a mold for Izod impact test pieces, to obtain an Izod impact test piece.

Comparative Example D 500 g of glass fiber-reinforced polyamide 66 resin (ZYTEL 70G-33L) and 3.34 g of black master batch B-1 (Comparative Example 1) were placed in a stainless steel tumbler and vigorously stirred for 1 hour.

The mixture obtained was kneaded in a molten state at 300° C. using a vent type extruding machine (manufactured by Enpura Sangyo, product name: E30SV) and treated by a conventional method to yield colored pellets, which were vacuum-dried at 120° C. for 6 hours. After drying, the pellets were molded into a test plate at 280 to 300° C. by an ordinary method using an injection molding machine (produced by Kawaguchi Tekko, product name: KM50-C). A bluish black molded test plate with good compatibility between the resin and the dye [48×86×3 (mm)] was obtained. The same treatment was performed but the mold was replaced with a mold for Izod impact test pieces, to obtain an Izod impact test piece.

For the black molded plates obtained in Examples C and D and Comparative Examples C and D, surface gloss was measured using a gloss meter. The results are shown in Table 3. Greater values indicate higher glossiness.

TABLE 3

|  | 20° | 60° | 85° |
| --- | --- | --- | --- |
| Example C | 57.9 | 85.7 | 99.2 |
| Example D | 56.3 | 86.5 | 99.7 |
| Comparative Example C | 54.2 | 85.0 | 97.5 |
| Comparative Example D | 53.8 | 84.2 | 97.3 |

The black molded plates obtained in Examples C and D showed better surface glossiness at all angles of incidence than the black molded plates obtained in Comparative Examples C and D.

For the Izod impact test pieces obtained in Examples C and D and Comparative Examples C and D, Izod impact values were measured. The results are shown in Table 4. NATURAL in Table 4 indicates an Izod impact test piece obtained by molding non-colored glass fiber-reinforced polyamide 66 resin (ZYTEL 70G-33L) in the same manner as Example C.

TABLE 4

|  | Ave | Max | Min | CV |
| --- | --- | --- | --- | --- |
| NATURAL | 8.52 | 8.84 | 8.29 | 0.22 |
| Example C | 5.78 | 6.57 | 4.67 | 0.75 |
| Example D | 6.69 | 7.33 | 6.15 | 0.43 |

TABLE 4-continued

|  | Ave | Max | Min | CV |
| --- | --- | --- | --- | --- |
| Comparative Example C | 5.27 | 6.20 | 4.23 | 0.77 |
| Comparative Example D | 5.00 | 6.01 | 2.89 | 1.34 |

Ave: average value; Max: maximum value; Min: minimum value; CV: standard deviation The results obtained showed that the Izod impact test pieces obtained in Examples C and D had Izod impact values about 20% better than those of the Izod impact test pieces obtained in Comparative Examples C and D.

What is claimed is:

1. Method of producing a granulated colorant, which comprises a blending step for blending a powdery black oil-soluble nigrosine dye and water to form a blend, a granulation step for obtaining a cylindrical granulation colorant from the blend obtained in said blending step using an extrusion granulating machine, and a drying step for drying the cylindrical granulation colorant obtained in said granulation step, wherein said nigrosine dye is C.I. SOLVENT BLACK 5, C.I. SOLVENT BLACK 5:1, C.I. SLOVENT BLACK 5:2 or C.I. SLOVENT BLACK 7 and said cylindrical granulation colorant after drying by said drying step has a diameter of 2 to 4 mm, a length of 7 to 12 mm, bulk density of 0.4 to 0.7 g/ml and a hardness of 1 to 20 N.

2. Method of producing a granulated colorant of claim 1, wherein said blending step is a step for blending 100 parts by weight of said powdery black oil-soluble nigrosine dye and 20 to 55 parts by weight of water using a rotary mechanical mixer.

3. Method of producing a granulated colorant of claim 1, wherein said granulation step is a step for obtaining said cylindrical granulation colorant having a hardness after drying of 1 to 20 N by granulating the blend obtained in said blending step, while adjusting the pressure, revolution speed, or both pressure and revolution speed of the extrusion granulating machine.

4. A method of producing a granulated colorant, the method comprising the steps of:
providing a powdery oil-soluble nigrosine dye;
blending said powdery oil-soluble nigrosine dye with water to form a blend;
granulating said blend to form a cylindrical granulation colorant, said granulating is formed in an extrusion granulating machine;
drying said cylindrical granulation colorant to form the granulated colorant, said granulating being performed to have the granulated colorant having a bulk density of 0.4 to 0.7 g/ml and a hardness of 1 to 20 N, wherein said cylindrical granulation colorant after drying by said drying step has a diameter of 2 to 4 mm and a length of 7 to 12 mm.

5. A method in accordance with claim 4, wherein:
said blending includes combining 100 parts by weight of said powdery oil-soluble nigrosine dye and 20 to 55 parts by weight of water;
said hardness of the granulated colorant after drying of 1 to 20 N is obtained by adjusting a pressure or revolution speed of said extrusion granulating machine.

6. A method in accordance with claim 4, wherein:
said blending and said drying being performed to form the granulated colorant with 50% or less polymer by weight.

7. A method in accordance with claim 4, wherein:
said blending and said drying being performed to form the granulated colorant with 25% or more dye by weight.

8. A method in accordance with claim 4, wherein:
said blend includes no polymers.

9. A method in accordance with claim 1, wherein:
the hardness of said granulation product colorant after drying by said drying step is 2 to 15 N.

10. A method in accordance with claim 1, wherein:
said powdery black oil-soluble nigrosine dye has a specific surface area of 1.5 to 5.5 m²/g as determined by the BET method.

11. A method in accordance with claim 1, wherein:
said powdery black oil-soluble nigrosine dye has an aniline content of not more than 2000 ppm.

12. Method of producing a granulated colorant, which comprises:
a blending step for blending materials consisting of a powdery black oil-soluble nigrosine dye and water, and a surfactant or metal soap;
a granulation step for obtaining a cylindrical granulation colorant from the blend obtained in said blending step using an extrusion granulation machine, and;
a drying step for drying the cylindrical granulation colorant obtained in said granulation step, wherein said nigrosine dye is C.I SOLVENT BLACK 5, C.I SOLVENT BLACK 5:1, C.I. SOLVENT BLACK 5:2 or C.I SOLVENT BLACK 7 and said cylindrical granulation colorant after drying by said drying step has a diameter of 2 to 4 mm, a length of 7 to 12 mm, a bulk density of 0.4 to 0.7 g/ml and a hardness of 1 to 20 N.

13. A method in accordance with claim 12, wherein:
said blending step is a step for blending materials consisting of 100 parts by weight of said powdery black oil-soluble nigrosine dye and 20 to 55 parts by weight of water using a rotary mechanical mixer.

14. A method in accordance with claim 4, wherein the hardness of said granulation colorant after drying by said drying step is 2 to 15 N.

15. A method in accordance with claim 4, wherein:
said powdery oil-soluble nigrosine dye has a specific surface area of 1.5 to 5.5 m²/g as determined by the BET method.

16. A method in accordance with claim 4, wherein:
said powdery oil-soluble nigrosine dye has an aniline content of not more than 2000 ppm.

17. A method in accordance with claim 4, wherein:
said blending blends materials consisting of 100 parts by weight of said powdery oil-soluble nigrosine dye and 20 to 55 parts by weight of water using a rotary mechanical mixer.

18. A method in accordance with claim 4, wherein:
said nigrosine dye is C.I. SOLVENT BLACK 5, C.I. SOLVENT BLACK 5:1, C.I. SOLVENT BLACK 5:2 or C.I. SOLVENT BLACK 7.

19. A method in accordance with claim 4, wherein:
said cylindrical granulation colorant after drying by said drying step has a diameter of 2 to 4 mm, a length of 7 to 12 mm.

* * * * *